(12) United States Patent
McMaster et al.

(10) Patent No.: US 6,425,269 B1
(45) Date of Patent: Jul. 30, 2002

(54) METHOD FOR GLASS SHEET FORMING

(75) Inventors: Ronald A. McMaster, Perrysburg; Michael J. Vild, Toledo; Donivan M. Shetterly, Rudolph; Paul D. Ducat, Perrysburg, all of OH (US)

(73) Assignee: Glasstech, Inc., Perrysburg, OH (US)

( * ) Notice: Subject to any disclaimer, the term of this patent is extended or adjusted under 35 U.S.C. 154(b) by 16 days.

(21) Appl. No.: 09/594,966

(22) Filed: Jun. 15, 2000

(51) Int. Cl.[7] ............................................ C03B 23/035
(52) U.S. Cl. ......................... 65/106; 65/25.1; 65/25.2; 65/25.4; 65/64; 65/182.1; 65/182.2; 65/244; 65/260; 65/273; 65/289; 65/290; 65/291; 65/307
(58) Field of Search ................................. 65/25.1, 25.2, 65/25.4, 64, 106, 182.1, 182.2, 244, 260, 273, 289, 290, 291, 307

(56) References Cited

U.S. PATENT DOCUMENTS

| | | | |
|---|---|---|---|
| 4,221,580 A | * | 9/1980 | Frank |
| 4,575,390 A | | 3/1986 | McMaster |
| 4,578,103 A | | 3/1986 | Fackelman |
| 4,615,724 A | | 10/1986 | Fackelman |
| 4,711,653 A | * | 12/1987 | Frank et al. |
| 4,746,348 A | * | 5/1988 | Frank |
| 4,859,225 A | * | 8/1989 | Kuster et al. |
| 4,990,170 A | * | 2/1991 | Vanaschen et al. |
| 5,002,599 A | | 3/1991 | McMaster et al. |
| 5,004,491 A | * | 4/1991 | McMaster et al. |
| 5,066,321 A | | 11/1991 | Kramer et al. |
| 5,330,550 A | * | 7/1994 | Kuster et al. |
| 5,376,158 A | | 12/1994 | Shetterley et al. |
| 5,393,316 A | * | 2/1995 | Sugiyama et al. |
| 5,669,953 A | | 9/1997 | Schnabel, Jr. et al. |
| 5,755,845 A | * | 5/1998 | Woodward et al. |
| 5,902,366 A | | 5/1999 | Schnabel, Jr. et al. |
| 6,009,726 A | * | 1/2000 | Funk |
| 6,038,887 A | * | 3/2000 | Vild et al. |
| 6,082,141 A | * | 7/2000 | Kuster |

* cited by examiner

Primary Examiner—Michael Colaianni
(74) Attorney, Agent, or Firm—Brooks & Kushman P.C.

(57) ABSTRACT

A method for forming glass sheets is performed by a system (10) that includes a furnace (12) having a heating chamber (14) in which a topside transfer device (20) has a downwardly facing surface (22) to which vacuum and pressurized air are supplied to receive and support a heated glass sheet from a conveyor (16) without any direct contact. A forming station (24) located externally of the furnace has a vertically movable upper mold (28) whose temperature is not greater than 500° C. The upper mold (28) cooperates with a horizontally movable lower ring (34) that transfers the heated glass sheet from the topside transfer device (20) to the forming station under the control of a first actuator (40). A second actuator (42) moves the upper mold (28) downwardly to cooperate with the lower ring (34) in forming the glass sheet. The external forming station (24) includes heat loss reducing apparatus (43) for reducing heat loss of the hot glass sheet during the forming. A vacuum impulse is provided to the upper mold (28) to assist in the forming. A cooling station (32) cools the formed glass sheet.

5 Claims, 2 Drawing Sheets

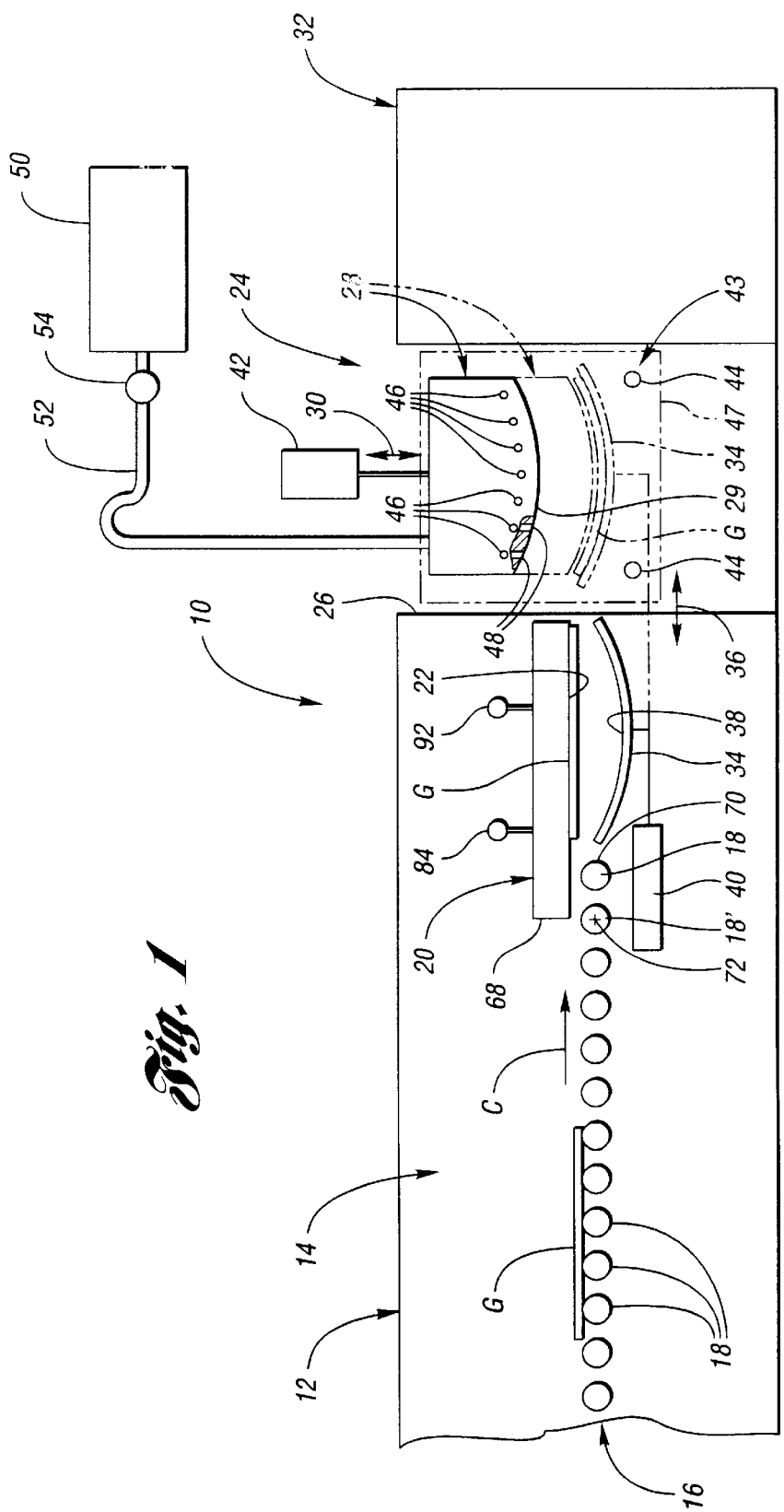

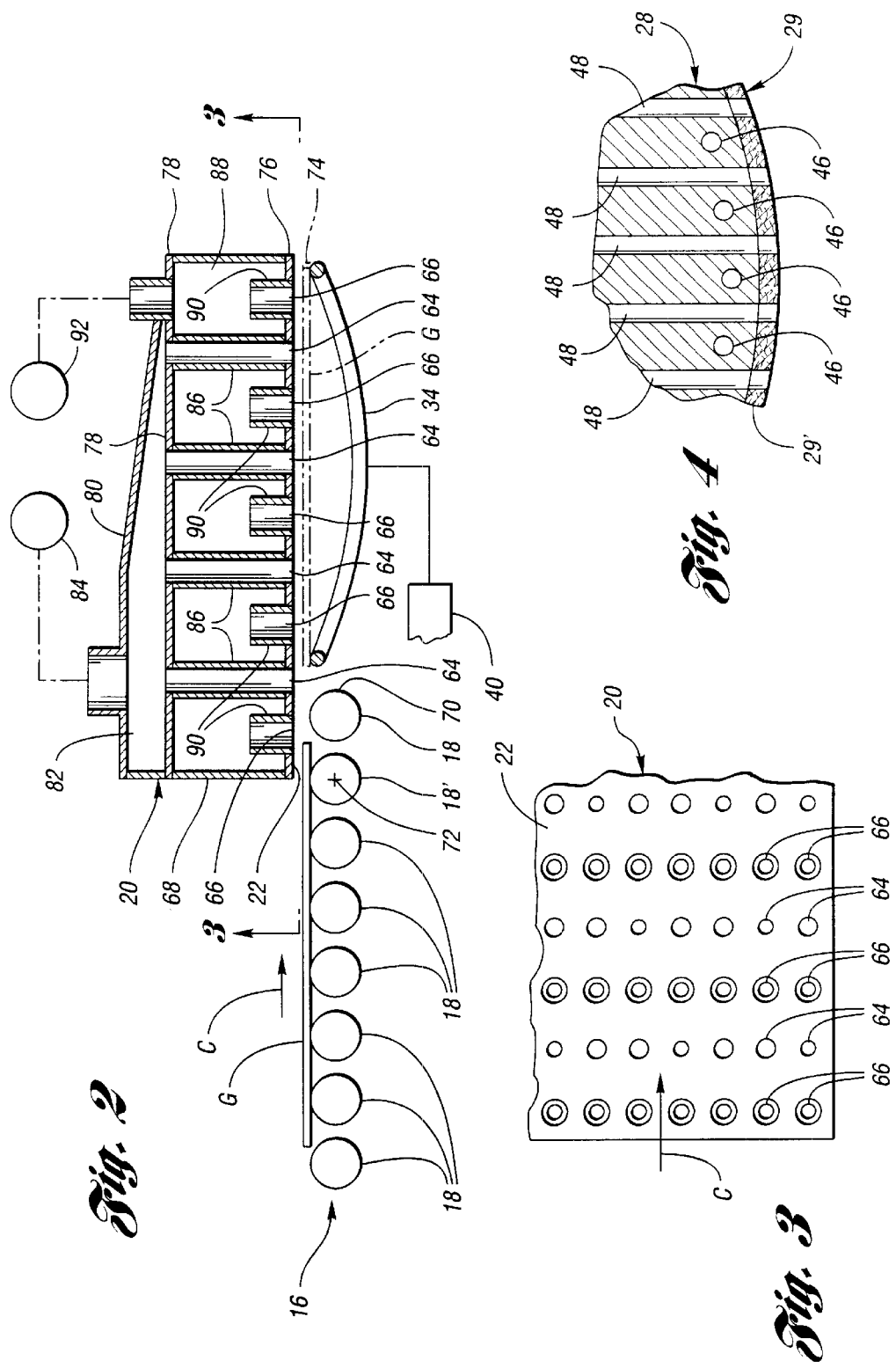

METHOD FOR GLASS SHEET FORMING

TECHNICAL FIELD

This invention relates to a method for forming heated glass sheets.

BACKGROUND ART

Glass sheet forming systems conventionally include a furnace having a heating chamber in which a conveyor conveys glass sheets for heating to a sufficiently hot temperature to permit forming. Normally furnace heating chambers are heated to about 650 to 720° C. to provide glass sheet heating to about 620 to 660° C. for forming by one or more molds and optional subsequent quenching. U.S. Pat. Nos. 4,578,103 Fackelman, U.S. Pat. No. 4,615,724 Fackelman and U.S. Pat. No. 5,002,599 McMaster et al. disclose topside transfer devices for transferring heated glass sheets without any direct contact from a heating conveyor to a mold for forming. A vacuum and pressurized air supplied to a downwardly facing surface of the topside transfer device provides the topside support of the glass sheet without any direct contact. Such transfer can be effectively performed by using positioning apparatus as disclosed by U.S. Pat. Nos. 5,066,321 Kramer et al., U.S. Pat. No. 5,669,953 Schnabel, Jr. et al., and U.S. Pat. No 5,902,366 Schnabel, Jr. et al. The forming has previously been performed with an upper mold also located within the heating chamber of the furnace as disclosed by U.S. Pat. No. 4,575,390 McMaster.

While glass sheet forming has previously been conducted externally of a furnace heating chamber as disclosed by U.S. Pat. No. 5,755,845 Woodward et al., the transfer of the glass sheet to such external molds has previously been performed by roller conveyors which require a split mold for passing through the molds to perform the forming. While use of external molds is desirable in allowing the use of materials that do not have to withstand the relatively high temperature of a furnace heating chamber, there has not heretofore been an effective system or method for performing glass sheet forming at an external location outside of the furnace heating chamber.

DISCLOSURE OF INVENTION

An object of the invention is to provide an improved method for forming glass sheets.

In carrying out the above object, the method for forming glass sheets in accordance with the invention is performed by conveying a glass sheet within a heating chamber of a furnace for heating sufficiently hot to permit forming of the glass sheet. The heated glass sheet is transferred to a downwardly facing surface of a topside transfer device within the heating chamber of the furnace where vacuum and pressurized air are supplied to support the heated glass sheet without any direct contact. The hot glass sheet is released from the topside transfer device onto a lower ring, and the lower ring is then moved with the hot glass sheet thereon horizontally out of the heating chamber of the furnace to a forming station that includes an upper mold located externally of the furnace heating chamber so the upper mold has a temperature that is not greater than 500° C. The upper mold of the forming station is then moved downwardly to cooperate with the lower ring in forming the hot glass sheet.

In carrying out the glass sheet forming method, heat loss of the hot glass sheet is reduced during the forming.

The forming method is also performed utilizing an impulse vacuum that is supplied to the upper mold to assist in the glass sheet forming.

The glass sheet forming method is also disclosed as including moving the formed glass sheet horizontally from the forming station to a cooling station for cooling which may be annealing, heat strengthening or tempering.

The objects, features and advantages of the present invention are readily apparent from the following detailed description of the best mode for carrying out the invention when taken in connection with the accompanying drawings.

BRIEF DESCRIPTION OF DRAWINGS

FIG. 1 is a schematic side elevational view of a glass sheet forming system constructed in accordance with the invention to perform glass sheet forming.

FIG. 2 is a partial sectional view taken in the same direction as FIG. 1 to further illustrate the construction of a heating furnace and a topside transfer device within a furnace of the system.

FIG. 3 is a bottom plan view taken along the direction of line 3—3 in FIG. 2 to further illustrate the construction of the topside transfer device.

FIG. 4 is a partial view showing a heat insulative cover on a forming face of an upper mold of a forming station of the system.

BEST MODE FOR CARRYING OUT THE INVENTION

With reference to FIG. 1 a schematically illustrated glass sheet forming system 10 is constructed to perform the method of the invention. Forming system 10 includes a furnace 12 having a heating chamber 14 that includes a roll type conveyor 16 including rolls 18 for conveying glass sheets 0 along a direction of conveyance shown by arrow C so as to be heated sufficiently hot to permit forming of the glass sheets. Normally the furnace heating chamber will be heated to 650 to 720° C. to provide a heated glass temperature of about 640 to 660° C. A topside transfer device 20 is located within the heating chamber 14 of the furnace 12 and has a downwardly facing surface 22 to which vacuum and pressurized air are supplied to support a heated glass sheet received from the conveyor without any direct contact as is hereinafter more fully described. A forming station 24 of the system is located externally of the furnace heating chamber at the right exit end 26 of the furnace. This forming station 24 has an upper mold 28 that has a downwardly facing forming face 29 and is movable vertically as shown by arrows 30 between the solid line indicated upper position and the phantom line indicated lower position as is hereinafter more fully described. To the right of the forming station 24, the system 10 is shown as also including a cooling station 32 for cooling the formed glass sheet.

With continuing reference to FIG. 1, the glass sheet forming system 10 includes a lower ring 34 that is movable horizontally as shown by arrows 36 and has an upwardly facing forming face 38 that is of a peripheral construction generally corresponding to the periphery of the glass sheet G to be formed. A first actuator 40 commences a cycle of glass sheet forming by moving the lower ring 34 horizontally to a first position shown by solid line representation within the heating chamber 14 of the furnace 10 where the lower ring receives a hot glass sheet from the topside transfer device 20 upon termination of support thereof as the vacuum is terminated. The first actuator 40 then moves the lower ring 34 outwardly from the furnace 10 to a second position shown by phantom line representation at the forming station 24 below the upper mold 28. A second actuator 42 then moves the upper mold 28 downwardly toward the lower ring 34 in the second position to cooperate with the lower ring in forming the hot glass sheet, and the upper mold is subsequently moved upwardly back to the upper position in preparation for the next cycle.

The location of the upper mold 28 externally of the furnace heating chamber allows it to operate at a much lower temperature than molds that are mounted for functioning internally within the furnace heating chamber in a more conventional manner. Furthermore, the manner in which the externally located upper mold 28 cooperates with the lower ring 34 that receives the hot glass sheet from the topside transfer device without any contact therewith at the upper glass surface provides effective delivery as well as forming of the glass sheet. More specifically, the upper mold 28 can be fabricated from cold rolled carbon steel or cast from iron and for relatively lower temperatures of about 300° C. and below it is possible to use aluminum and epoxy molds, none of which would be useable in the hot environment of the furnace heating chamber. Furthermore, the upper mold 28 can also be cast from certain refractories that have heat insulative properties and do not require significant machining. Thus, this system also provides for lower tooling costs since the upper mold 28 can be constructed more economically and thereby renders the system effective for low volume production by reducing the tooling costs for each formed glass sheet.

With continued reference to FIG. 1, the forming station 24 includes apparatus collectively indicated by 43 for reducing heat loss of the hot glass sheet G during the forming. This apparatus 43 is disclosed as including auxiliary heaters 44 that may be either electric resistance heaters or gas heaters for providing auxiliary heat to the forming station to reduce the heat loss from the hot glass sheet G. The heat loss reducing apparatus 43 also includes heaters 46 in the upper mold 28 of the forming station. These mold heaters 46 may be electric resistance heaters and provide heating of the forming face 29 to reduce heat loss from the hot glass sheet to the mold upon the mold-glass engagement that provides the glass sheet forming. Furthermore, the heat loss reducing apparatus as shown in FIG. 4 may also include a heat insulative cover 29', which may be ceramic paper, on the forming face 29 for reducing heat flow from the hot glass sheet to the upper mold 28 during the engagement that provides the glass sheet forming. Alternately, the forming face 29 may be made of a heat insulating material. Furthermore, the heat loss reducing apparatus 43 as shown in FIG. 1 may also include an enclosure 47 that reduces convective air drafts and encloses the forming station to prevent heat loss from the hot glass sheet. This enclosure 47 can be a separate chamber of the furnace but must be external of the heating chamber so as to have a lower temperature such that the upper mold 28 does not have a temperature greater than about 500° C.

The upper mold 28 of the forming station 24 preferably includes openings 48 to which a vacuum impulse is supplied from a vacuum reservoir 50 through a conduit 52 under the control of a valve 54. This vacuum impulse assists in the forming between the upper mold 28 and the lower ring 34 in accordance with the teachings of U.S. Pat. No. 5,376,158 Shetterly et al., the entire disclosure of which is hereby incorporated by reference.

The cooling station 32 of the system 10 is located to the right of the aforming station 24 as previously mentioned and provides cooling of the glass sheet upon movement thereto such as by continued movement to the right of the lower ring 34 after the forming at the forming station or by movement of the glass sheet to the right on another mold.

With reference to FIG. 2, the topside transfer device device 20 as illustrated is fabricated from temperature resistant sheet metal such as stainless steel and has its downwardly facing planar surface 22 located at an elevation just slightly higher than the conveyor rolls 18. The downwardly facing planar surface 22 of the topside transfer device 20 as also shown in FIG. 3 has a first set of holes 64 through which a vacuum is drawn to support a hot glass sheet received thereby from the roll conveyor 16. The downwardly facing planar surface 22 of the topside transfer device 20 also has a second set of holes 66 to which pressurized gas is supplied to space the hot glass sheet from the downwardly facing planar surface such that the support is provided without any contact with the glass sheet G. The topside transfer device 20 has an upstream end 68 that overlaps a downstream end 70 of the roll conveyor 16 with at least one conveyor roll, the conveyor roll 18 farthest to the right, located entirely below the downwardly facing planar surface 22 to support the hot glass sheet upon initially being received by the downwardly facing planar surface from the roll conveyor. More specifically, the roll conveyor 16 as shown has a single conveyor roll, the conveyor roll 18 located farthest toward the right, located entirely below the upstream end 68 of topside transfer device. In addition, the roll conveyor has another conveyor roll 18' that is located immediately adjacent the single conveyor roll located farthest toward the right, and this conveyor roll 18' has a center 72 that is located directly below an upstream extremity of the upstream end 68 of the topside transfer device 20.

As illustrated in FIG. 3, the first and second sets of holes 64 and 66 of the topside transfer device 20 are arranged in an alternating relationship along the direction of conveyance C so as to provide a uniform distribution of the vacuum and pressurized gas that support the glass sheet G from above without any contact as described above.

With reference back to FIG. 2, each heated glass sheet G is positioned below the downwardly facing surface 22 by phantom line indicating positioning apparatus 74 which may be of any suitable type such as disclosed by U.S. Pat. No. 5,066,321 Kramer et al., U.S. Pat. No. 5,669,953 Schnabel, Jr. et al., and U.S. Pat. No. 5,902,366 Schnabel, Jr. et al., the entire disclosures of which are hereby incorporated by reference.

With continuing reference to FIG. 2, the topside transfer device 20 is preferably constructed in the manner disclosed by U.S. Pat. No. 5,002,599 McMaster et al., the entire disclosure of which is hereby incorporated by reference. More specifically, this topside transfer device 20 as previously mentioned is fabricated from high temperature sheet metal such as stainless steel and includes a horizontally extending lower plate 76 that defines the downwardly facing surface 22 in which the first and second sets of holes 64 and 66 are provided as previously discussed. A horizontally extending upper plate 78 is located above the lower plate 74 and is covered by an upper sheet metal member 80 to cooperate therewith in defining a first chamber 82 in which a vacuum is drawn by a vacuum source 84. The upper plate 78 has holes communicated with the upper ends of tubular members 86 whose lower ends are communicated with the first set of holes 64 in the lower plate 76 to draw the vacuum at the downwardly facing surface 22 as previously described.

As also illustrated in FIG. 2, the lower and upper plates 76 and 78 of the topside transfer device 20 cooperatively define a second chamber 88 through which the tubular members 86 extend between the lower and upper plates 76 and 78. Short tubes 90 are mounted by the lower plate 76 with their lower ends providing the second set of holes 66 at the downwardly facing planar surface 22. A source of pressurized gas 92 feeds pressurized gas to the chamber 88 and through the short tubes 90 to provide pressurized gas to the downwardly facing surface 22. The short tubes 90 can be roll pins and provide sufficient flow length so the pressurized gas is supplied as jets that have the capability of spacing commercial size glass sheets from the downwardly facing planar surface 22 in association with the vacuum that is also drawn.

While the best mode for carrying out the invention has been described in detail, those familiar with the art to which this invention relates will recognize various alternatives, designs and embodiments for practicing the invention as defined by the following claims.

What is claimed is:

1. A method for forming glass sheets, comprising:

conveying a glass sheet within a heating chamber of a furnace for heating sufficiently hot to permit forming thereof;

transferring the heated glass sheet to a downwardly facing surface of a topside transfer device within the heating chamber of the furnace where vacuum and pressurized air are supplied to support the heated glass sheet without any direct contact;

releasing the hot glass sheet from the topside transfer device onto a lower ring;

moving the lower ring with the hot glass sheet thereon horizontally out of the heating chamber of the furnace to a forming station that includes an upper mold located externally of the furnace heating chamber so the upper mold has a temperature that is not greater than 500° C.; and moving the upper mold of the forming station downwardly to cooperate with the lower ring in forming the hot glass sheet.

2. A method for forming heated glass sheets as in claim 1 wherein heat loss of the hot glass sheet is reduced during the forming.

3. A method for forming heated glass sheets as in claim 1 wherein an impulse vacuum is supplied to the upper mold to assist in the glass sheet forming.

4. A method for forming heated glass sheets as in claim 1 wherein the formed glass sheet is moved horizontally from the forming station to a cooling station for cooling.

5. A method for forming glass sheets, comprising:

conveying a glass sheet within a heating chamber of a furnace for heating sufficiently hot to permit forming thereof;

transferring the heated glass sheet to a downwardly facing surface of a topside transfer device within the heating chamber of the furnace where vacuum and pressurized air are supplied to support the heated glass sheet without any direct contact;

releasing the hot glass sheet from the topside transfer device onto a lower ring;

moving the lower ring with the hot glass sheet thereon horizontally out of the heating chamber of the furnace to a forming station that includes an upper mold located externally of the furnace heating chamber so the upper mold has a temperature that is not greater than 500° C.;

moving the upper mold of the forming station downwardly to cooperate with the lower ring in forming the hot glass sheet;

reducing heat loss from the hot glass sheet at the forming station during the forming; and moving the formed glass sheet horizontally from the forming station to a cooling station for cooling.

* * * * *